United States Patent
Miyake

(10) Patent No.: US 8,131,323 B2
(45) Date of Patent: Mar. 6, 2012

(54) HANDSFREE APPARATUS

(75) Inventor: Kenji Miyake, Anjo (JP)

(73) Assignee: Denso Corporation, Kariya (JP)

( * ) Notice: Subject to any disclaimer, the term of this patent is extended or adjusted under 35 U.S.C. 154(b) by 195 days.

(21) Appl. No.: 12/658,355

(22) Filed: Feb. 5, 2010

(65) Prior Publication Data

US 2010/0210315 A1    Aug. 19, 2010

(30) Foreign Application Priority Data

Feb. 13, 2009    (JP) ................. 2009-031232

(51) Int. Cl.
H04W 4/00    (2009.01)
(52) U.S. Cl. ............. 455/569.2; 455/567; 709/206
(58) Field of Classification Search .......... 455/569.2, 455/567; 709/206
See application file for complete search history.

(56) References Cited

U.S. PATENT DOCUMENTS

| 7,299,032 B2 | 11/2007 | Yamada et al. |
| 2008/0114849 A1 | 5/2008 | Yuyama |
| 2010/0144398 A1 * | 6/2010 | Abeta ........ 455/569.2 |
| 2010/0144399 A1 * | 6/2010 | Abeta ........ 455/569.2 |
| 2010/0233998 A1 * | 9/2010 | Saito ........ 455/412.2 |

FOREIGN PATENT DOCUMENTS

| JP | 2000-181818 | 6/2000 |
| JP | 2002-176486 | 6/2002 |
| JP | 2002-223288 | 8/2002 |
| JP | 2003-174676 | 6/2003 |
| JP | 2005-175832 | 6/2005 |
| JP | 2005-176194 | 6/2005 |
| JP | 2006-186908 | 7/2006 |
| JP | 2008-123292 | 5/2008 |

OTHER PUBLICATIONS

Office action dated Nov. 9, 2010 in corresponding Japanese application No. 2009-031232.

* cited by examiner

*Primary Examiner* — Pierre-Louis Desir
(74) *Attorney, Agent, or Firm* — Harness, Dickey & Pierce, PLC

(57) ABSTRACT

A handsfree apparatus notifies a user of the reception of a mail if the reception of the mail by a cellular phone happens during a call, and stores an unread history of the received mail in a memory unit if a mail content display operation is not performed. Further, the handsfree apparatus notifies the user of the unread history of the received mail when Bluetooth connection link to the cellular phone having received the mail is disconnected, thereby enabling the received mail to be recognized by the user.

7 Claims, 9 Drawing Sheets

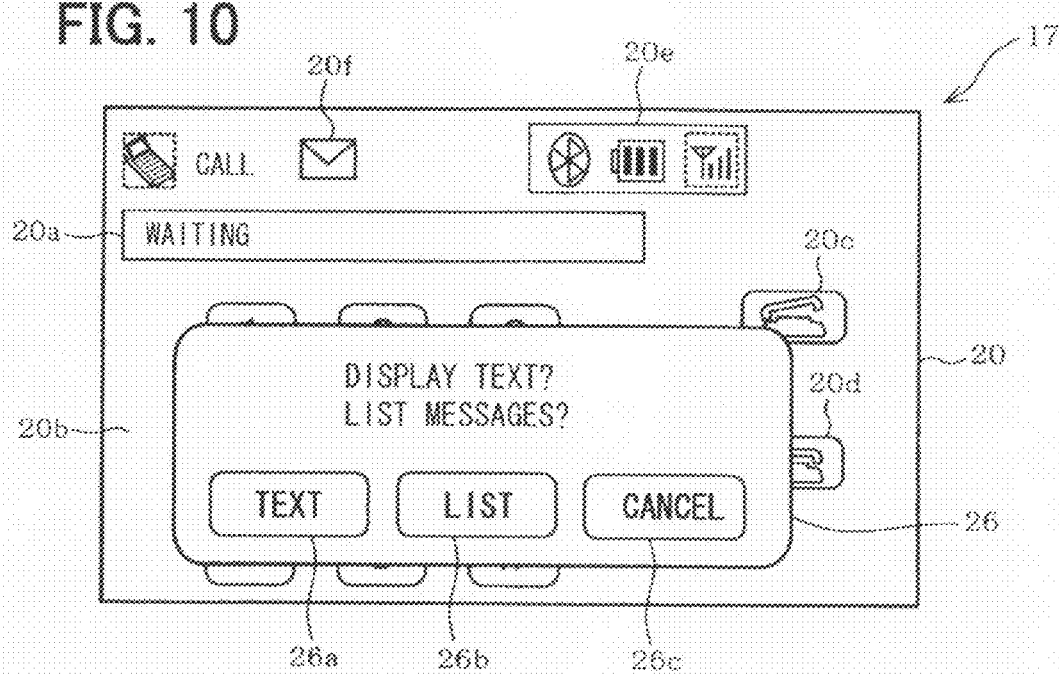
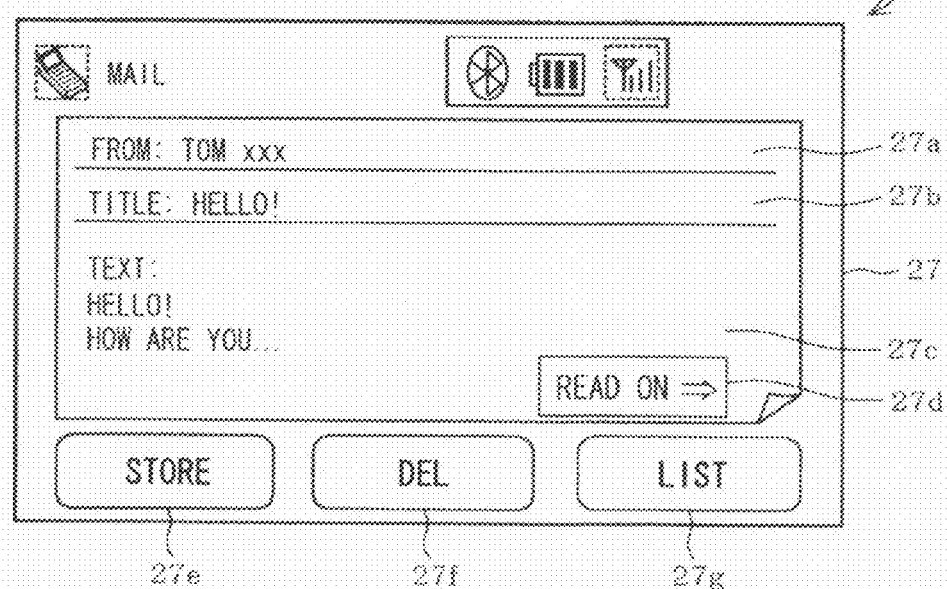

HANDSFREE APPARATUS

CROSS REFERENCE TO RELATED APPLICATION

The present application is based on and claims the benefit of priority of Japanese Patent Application No. 2009-31232, filed on Feb. 13, 2009, the disclosure of which is incorporated herein by reference.

FIELD OF THE INVENTION

The present disclosure generally relates to a handsfree apparatus that is capable of multiple protocols at the same time for simultaneously transferring mails and establishing a handsfree call to a cellular phone.

BACKGROUND INFORMATION

Conventionally, a handsfree call with a cellular phone has been enabled though Bluetooth communication function of a handsfree apparatus in the vehicle compartment. That is, the Bluetooth-enabled cellular phone establishes a Bluetooth communication link with the Bluetooth-enabled handsfree apparatus in the vehicle compartment for connecting a Handsfree Profile (HFP) of the Bluetooth standard for the purpose of establishing a handsfree call (see, for example, Japanese patent document JP-A-2002-223288).

Further, another Bluetooth standard is considered to implement mail transfer from the cellular phone to the handsfree apparatus, for the purpose of notifying the user of the reception of the mail, in the name of Message Access Profile (MAP). The applicant of the present invention is now considering to implement multiple connection of HFP and MAP simultaneously between the cellular phone and the handsfree apparatus during a call to the cellular phone. (Note that Bluetooth is henceforth abbreviated to BT.)

In such a case, mail reception by the cellular phone and mail reception notification from the handsfree apparatus to the user can both be performed while the user is involved in a call to the cellular phone. However, if the user is absorbed in the conversation with the caller, the mail reception notification from the handsfree apparatus may be overlooked. As a result, the user may leave the received mail unattended and may forget about the mail reception itself.

SUMMARY OF THE INVENTION

In view of the above and other problems, the present disclosure provides a handsfree apparatus that reminds the user of the mail reception during a call by suitably providing notification from the apparatus side, for preventing the user from leaving the mail unattended.

In an aspect of the present disclosure, a handsfree apparatus in a vehicle includes: a connection unit for establishing a simultaneous connection of a handsfree call protocol and a mail transfer protocol while the handsfree apparatus is connected to a cellular phone through a short range wireless. communication link, i.e., the handsfree protocol used for a handsfree call and the mail transfer protocol for a transfer of mails; a condition determination unit for determining whether or not the cellular phone having an established handsfree call protocol is having a call; a mail reception determination unit for determining whether or not the cellular phone having an established mail transfer protocol has received a mail; reception notification unit for notifying a user of a reception of the mail; a mail display unit for displaying a mail content of the mail that has been transferred from a network to the cellular phone; a display operation reception unit for receiving a mail display operation by a user for the displaying of the mail content; a control unit for controlling the reception notification unit to notify the user of the reception of the mail if the mail reception by the cellular phone is determined by the mail reception determination unit, and for controlling the mail display unit to display the mail content if the mail display operation by the user is received by the display operation reception unit, when the cellular phone having the simultaneous connection of the handsfree call protocol and the mail transfer protocol established to the connection unit is determined to be having a call by the condition determination unit; and a storage unit for storing yet-to-read history indicative of existence of a not yet displayed mail that has not yet been displayed on the mail display unit.

Further, when the control unit controls the storage unit to store the yet-to-read history, if the mail reception is notified for the user by the reception notification unit and the mail display operation by the user is not received by the display operation reception unit, the control unit determines whether or not a mail that has not been displayed by the mail display unit exists based on the yet-to-read history stored by the storage unit after disconnection of the short range communication link between the connection unit and the cellular phone having received the mail due to a fulfillment of a first condition, and the control unit controls a notification unit to notify the user of yet-to-read information that indicates that existence of not yet displayed mail has been determined.

Thus, the handsfree apparatus notifies the user of the mail reception when the cellular phone receives a mail while it is involved in a call, and then displays the mail contents of the received mail in case the user recognizes the mail reception notification and performs a mail display operation. On the other hand, in case the user does not recognizes the mail reception notification and does not perform the mail display operation, the unread mail (i.e., the mail with its contents not yet displayed on the screen) is stored as an unread history. Then, at the time when the short range wireless communication link to the cellular phone that has received the mail is disconnected by the fulfillment of the first condition, the unread history is notified from the handsfree apparatus to the user for reminding him/her that there is an unread mail, thereby preventing the user to leave the mail unattended and forget about the mail reception.

BRIEF DESCRIPTION OF THE DRAWINGS

Objects, features, and advantages of the present disclosure will become more apparent from the following detailed description made with reference to the accompanying drawings, in which:

FIG. 10 is an illustration of an inquiry pop-up message for mail display selections in a screen in the embodiment;

FIG. 11 is an illustration of a mail text screen in the embodiment;

DETAILED DESCRIPTION

Figure 1:
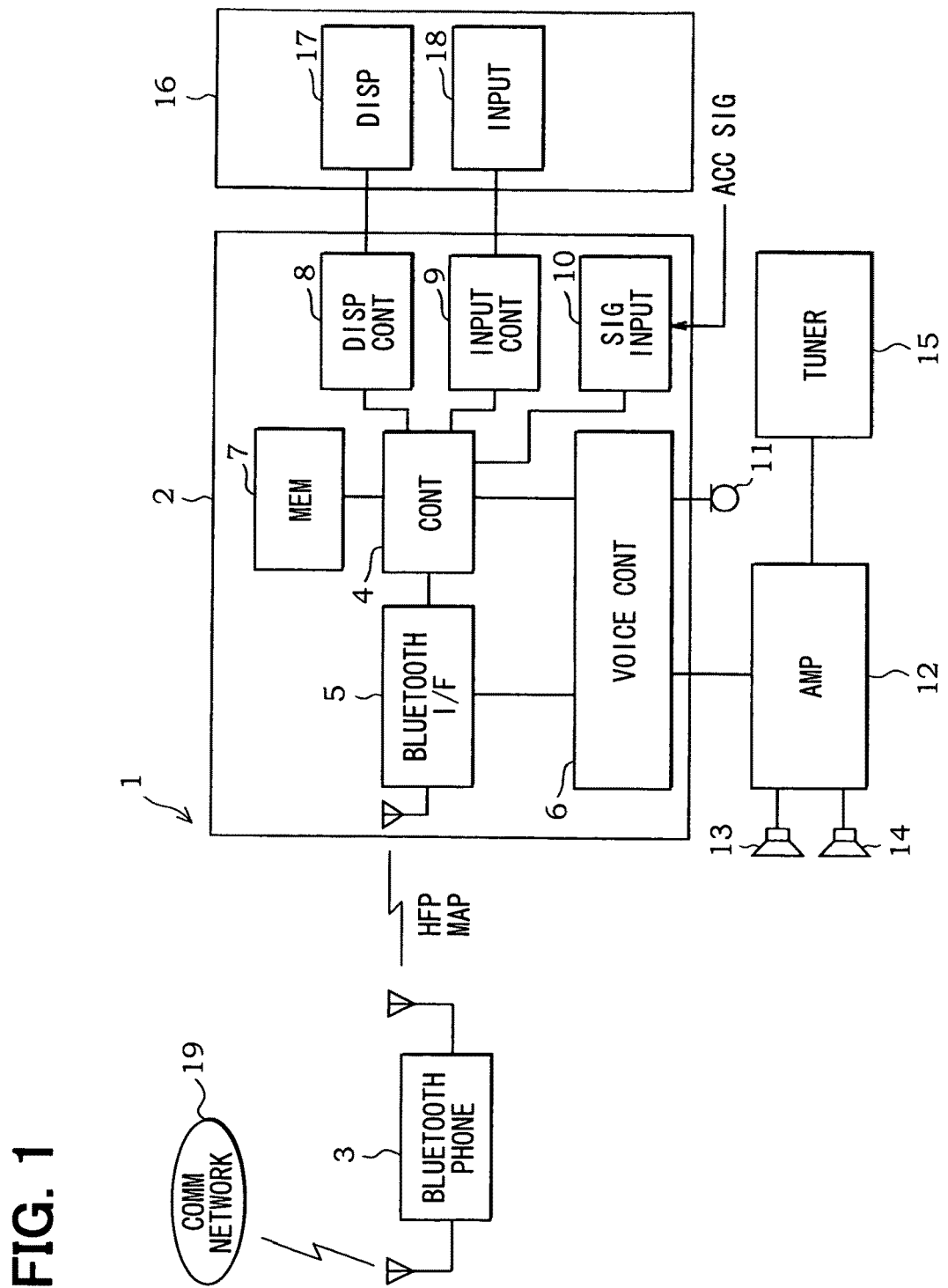
FIG. 1 is a block diagram of a handsfree system in an embodiment of the present disclosure.

A handsfree system 1 according to an embodiment is disclosed with reference to drawings. The handsfree system 1 is implemented as a combination of a handsfree apparatus 2 mounted in a vehicle having a Bluetooth (Registered trademark) communication function and a cellular phone 3 brought into the vehicle compartment. The handsfree apparatus 2 and the cellular phone 3 are assumed to be in the communication enabled condition through the Bluetooth protocol. In the following, the term "Bluetooth" is abbreviated to BT.

The handsfree apparatus 2 includes a control unit 4 (i.e., designated as a control unit, a condition determination unit, a mail reception determination unit, a cellular phone side disconnection operation reception determination unit in claims), a BT interface (I/F) unit 5 (i.e., a connection unit in claims), a voice control unit 6, a memory unit 7 (i.e., a storage unit in claims), a display controller 8, a touch input controller 9, and a signal input unit 10.

The control unit 4 has a CPU, a RAM, a ROM and an input/output (I/O) bus found in a well-known type microcomputer, and controls the entire operation of the handsfree apparatus 2. The operation of the apparatus 2 includes the communication operation and the data management operation. The BT interface unit 5 has a function to establish a BT communication link (i.e., a short range wireless communication link in claims) with the cellular phone 3, by being enabled to simultaneously connecting multiple profiles, that is, the handsfree profile (HFP: a handsfree call protocol in claims) and the message access profile (MAP: a mail transfer protocol in claims) defined in the Bluetooth communication standard. In this case, HFP is used to place a handsfree call, and MAP is used to transmit mail messages.

The mail, in this case, represents the well-known text messaging exchanged through computer networks. Therefore, the BT interface unit 5 supports, besides HFP and MAP, the phone book access profile (PBAP) for transmitting phone book data and call history data, the object push profile (OPP) for transmitting various kinds of data, and other profiles. These profiles are function specific communication protocols of the Bluetooth standards.

The voice control unit 6 has a connection to a microphone 11 that is installed at, for example, a steering wheel proximity position for collecting user's voice, and has a connection to an amplifier 12 that is external to the handsfree apparatus 2, having a connection to two speakers 13, 14 (i.e., a reception notification unit and a notification unit in claims). The speakers 13, 14 are symmetrically positioned relative to a front-rear axis placed along a longitudinal direction of the vehicle, and to be respectively installed in, for example, a driver's side door and a passenger's side door. Further, the amplifier 12 also has a connection to a tuner-deck 15, for having an input of music on a record medium or radio program from the deck 15 and for sending an output of amplified sound of the music/program to the speakers 13, 14.

The memory unit 7 is configured to be capable of memorizing various kinds of data, such as (a) phone book data to list telephone number to registration name relations, (b) outbound call history data to list call time to call number relations regarding call-placement operation of outbound calls from (b-1) the cellular phone 3 that is connected to the handsfree apparatus 2 through HFP and (b-2) the handsfree apparatus 2 itself, and (c) inbound call history data to list call time to call number relations regarding call-receiving operation of inbound calls to the cellular phone 3 that is connected to the handsfree apparatus 2 through HFP.

The signal input unit 10 inputs an accessory signal (ACC signal) from a key switch. The control unit 4 accepts the ACC signal from the signal input unit 10, and operates the handsfree apparatus 2 in a "wake-up" condition or in a "sleep condition" depending on the level of the ACC signal. That is, when the signal is in a high level, the handsfree apparatus 2 is turned on to operate normally, with all function blocks having power supply from the battery, and when the signal is in a low level, the handsfree apparatus 2 is tuned off to operate in a low power consumption mode, with only a few function blocks having power supply from the battery.

A display unit 16 includes a display screen 17 (i.e., a reception notification unit, a mail display unit, a notification unit in claims) and a touch operation input unit 18 (i.e., a display operation reception unit, a switch-off operation reception unit, a disconnection operation reception unit in claims). The display controller 8 controls the display operation of the display screen 17 of the display unit 16 based on a display instruction when the display instruction is input from the control unit 4. The touch controller 19 outputs to the control unit 4 the operation detection message input from the touch operation input unit 18 by the user operation through the touch switch on the screen, and the control unit 4 analyzes the operation detection message from the touch operation input unit 9.

The cellular phone 3 has the following units. That is, the cellular phone 3 has (a) a control unit for controlling the entire operation of the subject cellular phone, (b) a telephone communication unit for controlling telephone communication with a communication network 19, (c) a BT interface unit for controlling BT communication, (d) a key input unit for receiving user inputs from various key pieces, (e) a storage unit for storing various data such as, for example, telephone book data that lists telephone number to registration name relations, (f) a screen unit for showing various screens, (g) a microphone for picking up user's voice, and (h) a speaker for outputting caller's voice. In this case, the BT interface unit of the cellular phone 3 is capable of performing BT communication with the handsfree apparatus 2, and is capable of establishing multiple connections of HFP and MAP as the BT interface unit 5 of the handsfree apparatus 2.

The handsfree apparatus 2 is now assumed to be in HFP connection with the cellular phone 3 and to be waiting for a voice call to the cellular phone 3 from the communication network 19 in a waiting condition. The communication network 19 in this case is a well-known facility of a cellular phone network such as base stations, station controllers and the like.

Figure 2:
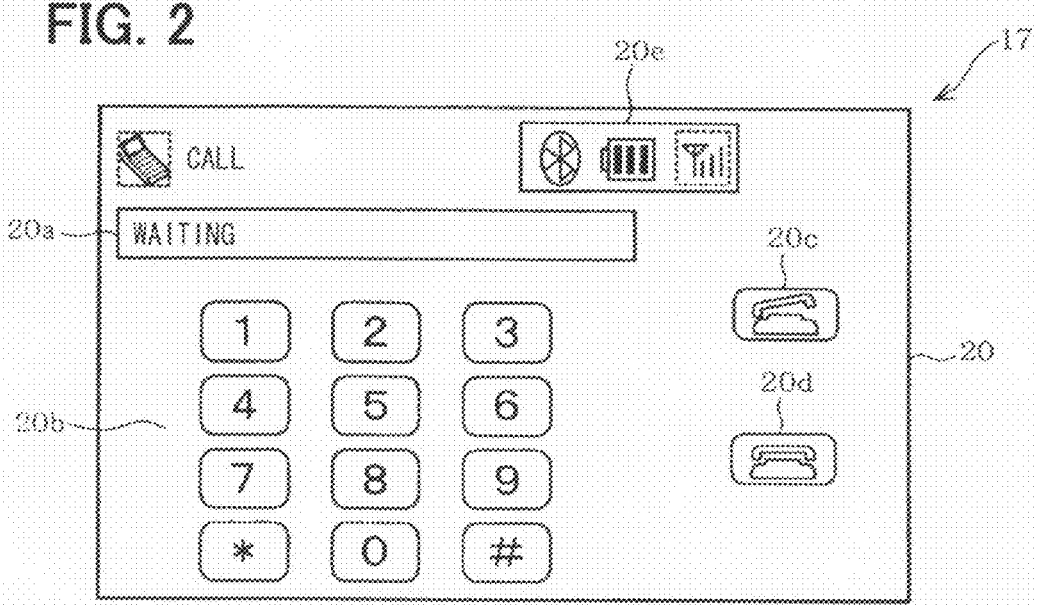
FIG. 2 is an illustration of a waiting screen in the embodiment.

In the handsfree apparatus 2, the control unit 4 displays a waiting screen 20 shown in FIG. 2 on the display screen 17 when it is waiting for the voice call to the cellular phone 3 in the HFP connected condition between the BT interface unit 5 and the cellular phone 3. More practically, the control unit 4 displays, as touch switches, the "Waiting" status in a condition display area 20*a*, and also displays number keys 1 to 9 together with '*' (asterisk) and '#' (sharp) signs. Further, the control unit displays a call switch 20*c* for call placement, a disconnect switch 20*d* for call disconnection as the touch switches. Further, the control unit 4 displays a battery icon for displaying a battery residue amount received from the cellular phone 3, and a signal intensity icon for displaying a radio signal reception condition in a cellular phone condition area 20*e*.

When the cellular phone 3 receives a voice call from the network 19 in the HFP connected condition, the cellular phone 3 notifies the handsfree apparatus 2 of reception of the voice call from the network 19. The notification of voice call reception may include the ID of the cellular phone 3 itself (e.g., the telephone number of the subject cellular phone 3), the caller's ID such as a caller's number, an inbound ring tone registered in the cellular phone 3 and the like, when such information and attributes are available.

Figure 3:
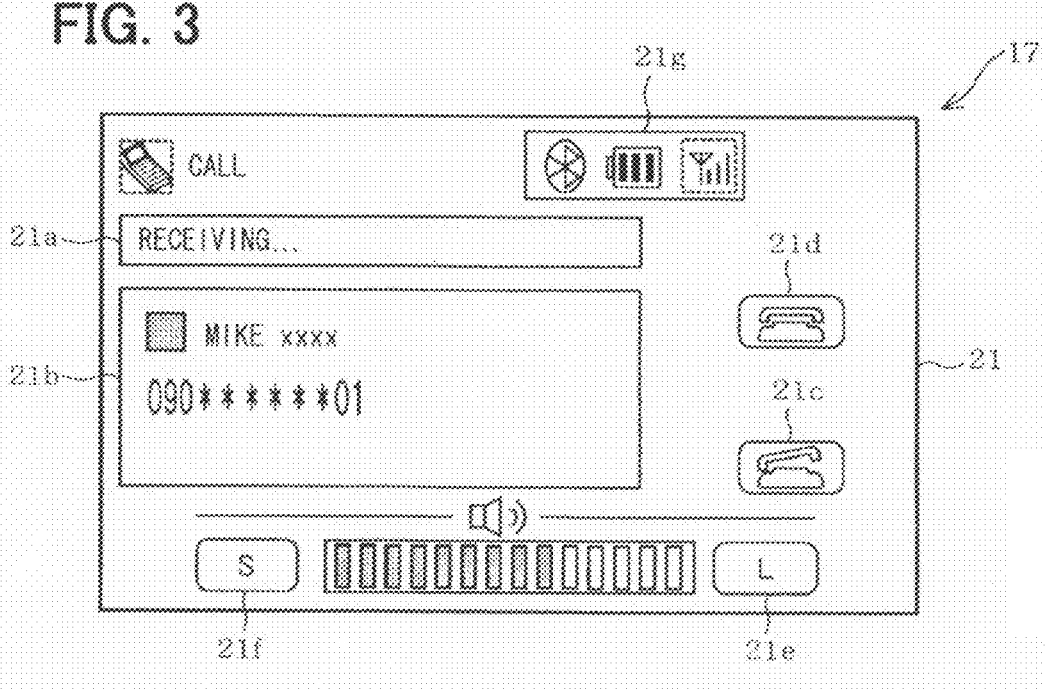
FIG. 3 is an illustration of a receiving screen of a voice call in the embodiment.

When the control unit 4 of the handsfree apparatus 2 receives the notification of voice call reception from the cellular phone 3 through the BT interface unit 5, the voice call reception is notified from the speakers 13, 14 to the user either by using a reception tone registered in the apparatus 2 or using the inbound ring tone transmitted from the cellular phone 3. Further, the screen 20 of FIG. 2 on the display screen 17 is switched to a screen 21 in FIG. 3, which indicates the voice call reception.

In this case, the caller's number "090******01" ('*' represents a digit of numerals) from the network 19 to the cellular phone 3 is transmitted from the cellular phone 3, and is displayed on the screen 21 in the caller information display area 21*b* together with the status of voice call reception in the condition display area 21*a* under control of the control unit 4. In this case, the caller's name MIKE is registered in the phone book in association with the caller's number.

In addition, the control unit 4 displays a call pick-up switch 21*c* for picking up a call, a call reject switch 21*d* for rejecting a call, a volume-up switch 21*e* and a volume-down switch 21*f* for controlling sound volume from the speaker 13, 14 in the screen 21. Further, the control unit 4 displays a battery icon for displaying a battery residue amount received from the cellular phone 3, and a signal intensity icon for displaying a radio signal reception condition in a cellular phone condition area 21*g*.

Therefore, the user can pick up the call as a handsfree call by operating the call pick-up switch 21*c* in the screen 21 when the cellular phone 3 is receiving a voice call, or can reject the call by operating the call reject switch 21*d* in the screen 21, or can pick up the call as a private call by operating a pick-up key on the cellular phone 3, or can reject the call by operating a reject key on the cellular phone 3. In this case, the handsfree call is a call through a sound path between the cellular phone 3 and the handsfree apparatus 2 for sound data exchange, by using the speakers 13, 14 and the microphone 11, and the private call is a call without the sound path for the sound data exchange therebetween, by using the speaker and the microphone of the cellular phone 3.

Figure 4:
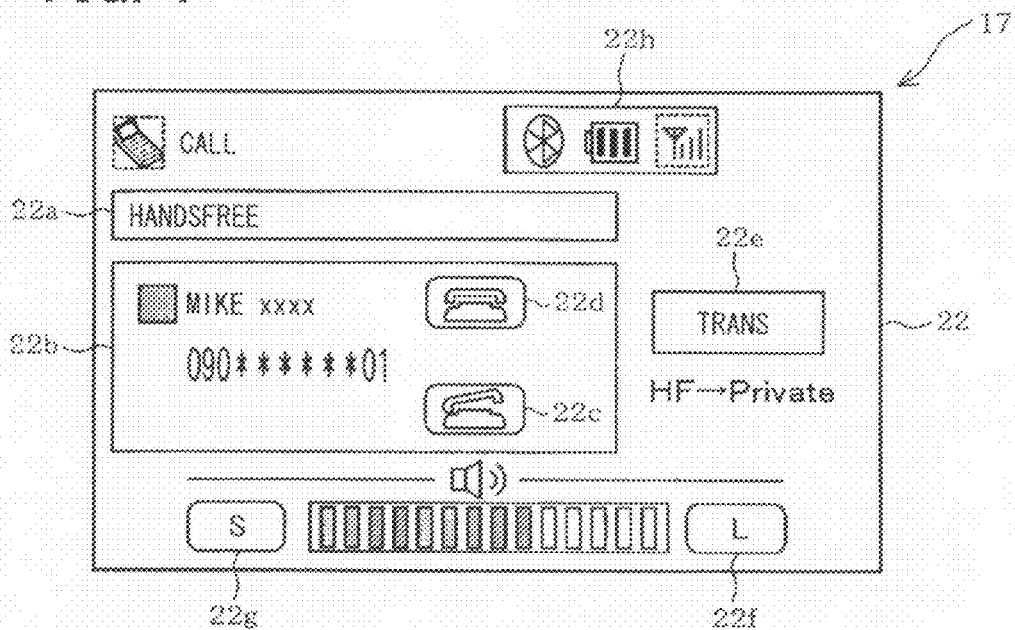
FIG. 4 is an illustration of a screen of a handsfree call in the embodiment.

If the user picks up a call as a handsfree call by operating the pick-up switch 21*c* in the screen 21, the control unit 4 controls the cellular phone 3 to perform the voice call reception operation to open the sound path, and controls the display screen 17 to display a screen 22 in FIG. 4, which is indicative of the handsfree call condition.

In this case, the caller's number "090****01" and the caller's name "MIKE" are displayed on the screen 22 in the caller information display area 22***b* together with the handsfree call status in the condition display area 22*a* under control of the control unit 4. Further, the control unit 4 displays a call hold switch 22*c* for allowing the user to put the call on hold, a call disconnection switch 22*d* for allowing the user to disconnect the handsfree call, a call transfer switch 22*e* for allowing the user to switch (i.e., transfer) the handsfree call to the private call, a volume-up switch 22*e* and a volume-down switch 22*f* for controlling sound volume from the speaker 13, 14 in the handsfree call screen 22. Further, the control unit 4 displays the battery icon for displaying the battery residue amount received from the cellular phone 3, and the signal intensity icon for displaying a radio signal reception condition in a cellular phone condition area 22*h*.

Figure 5:
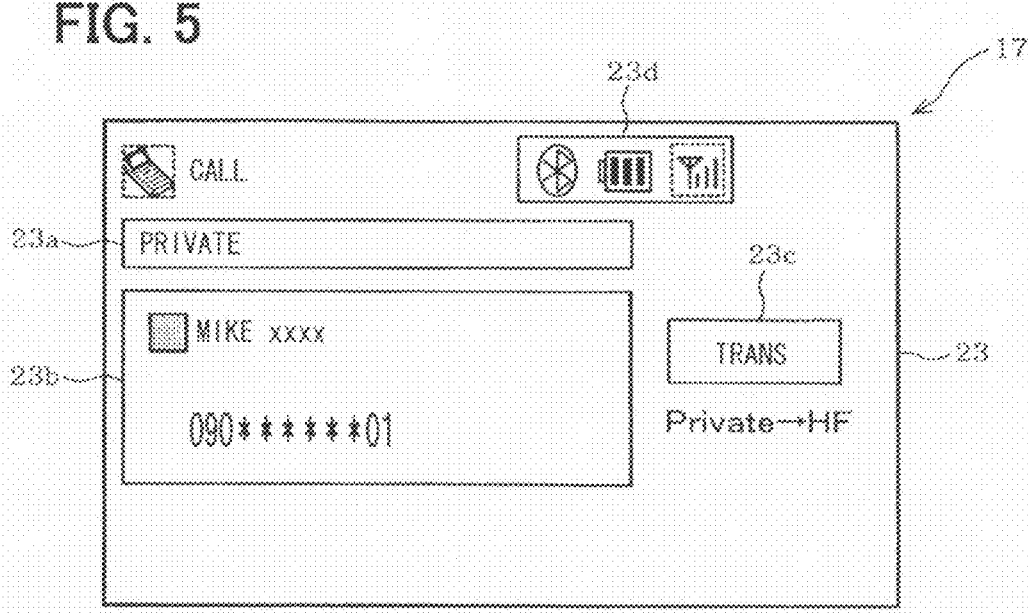
FIG. 5 is an illustration of a screen of a private call in the embodiment.
Figure 6:
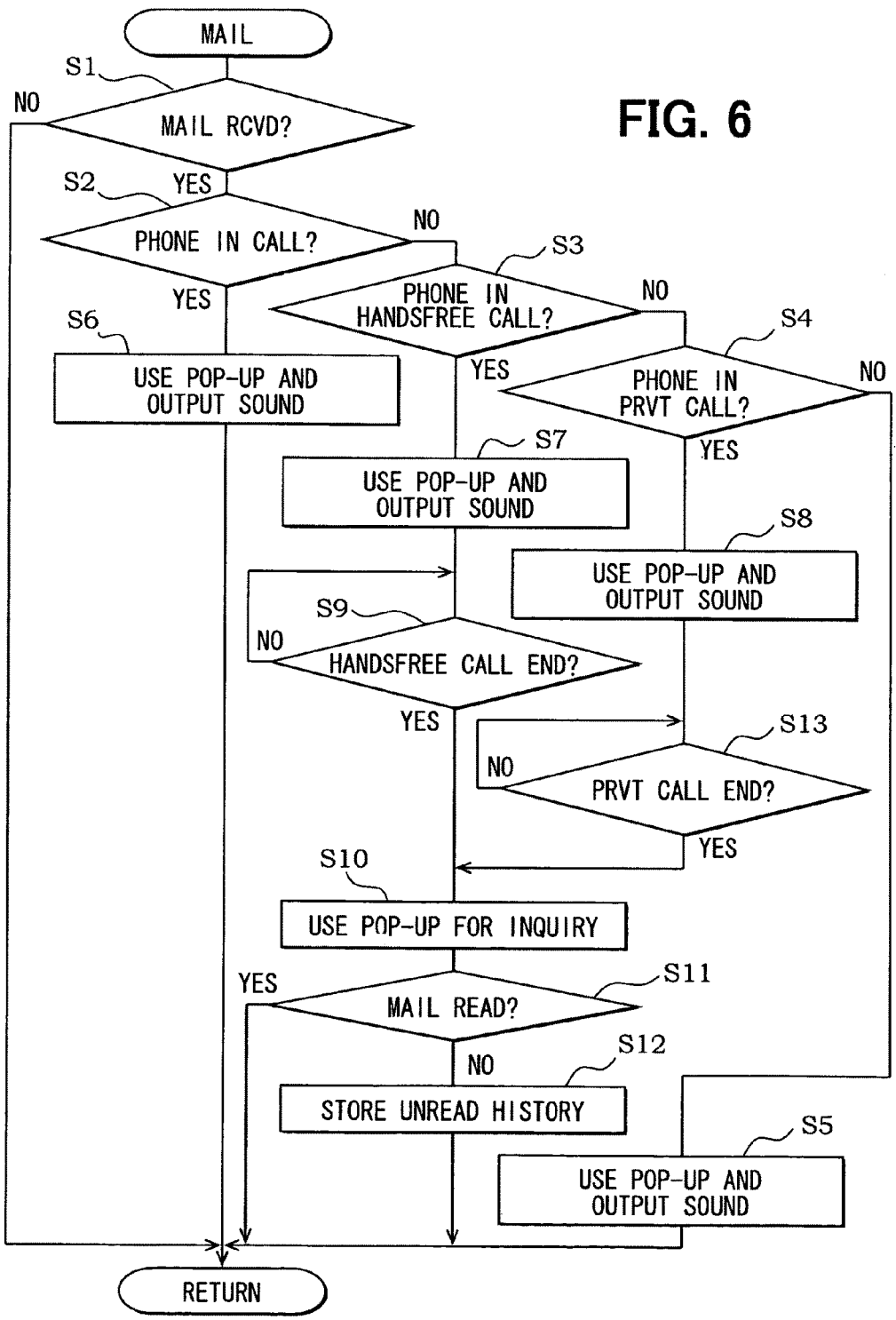
FIG. 6 is a flowchart of a mail reception detection process performed by a handsfree apparatus in the embodiment.
Figure 7:
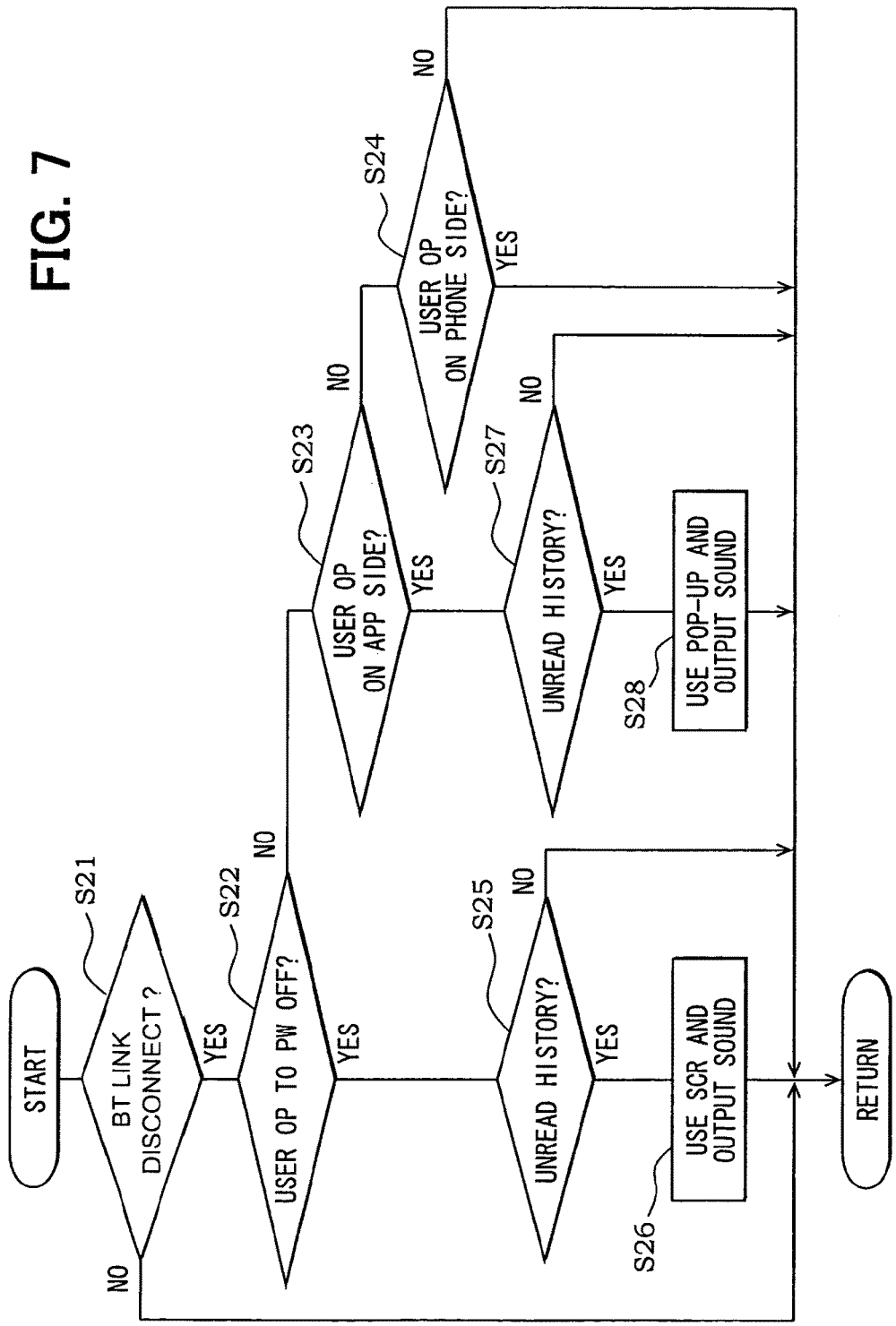
FIG. 7 is a flowchart of a disconnection request detection process performed by the handsfree apparatus in the embodiment.
Figure 8:
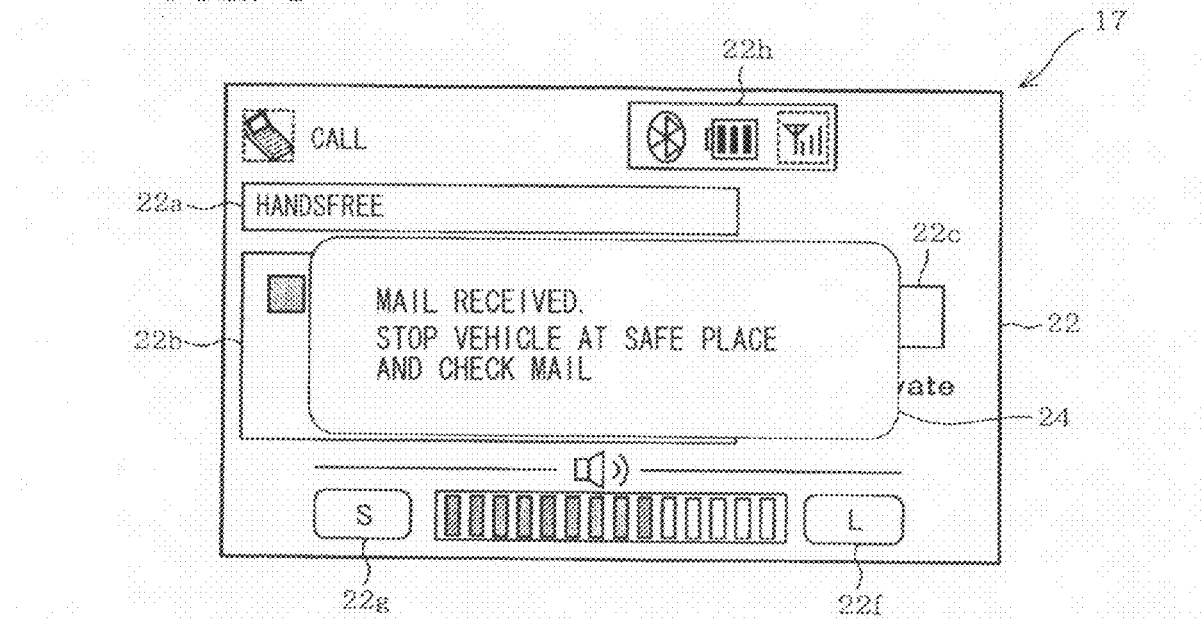
FIG. 8 is an illustration of a mail reception pop-up message in a screen in the embodiment.

On the other hand, if the user picks up a call as a private call by operating the pick-up switch on the cellular phone 3, the control unit 4 controls the cellular phone 3 to perform the voice call reception operation without opening the sound path, and controls the display screen 17 to switch the screen 21 to a screen 23 in FIG. 5, which is indicative of the private call condition, after the voice call is actually picked up by the cellular phone 3.

In the screen 23, the caller's number "090****01" and the caller's name "MIKE" are displayed in the caller information display area 23***b* together with the private call status in the condition display area 23*a* under control of the control unit 4. Further, the control unit 4 displays a call transfer switch 23*c* for allowing the user to switch (i.e., transfer) the private call to the handsfree call. Further, the control unit 4 displays the battery icon for displaying the battery residue amount received from the cellular phone 3, and the signal intensity icon for displaying a radio signal reception condition in a cellular phone condition area 23*d*.

The operation scheme of the handsfree apparatus 2 is now described with reference to FIGS. 6 to 15. The process performed by the handsfree apparatus 2 includes a mail reception detection process for determining that a mail is received by the cellular phone 3 from the network 19 and a disconnection request detection process for detecting that a request for disconnecting the BT communication link is generated. Both of the two processes are performed by the control unit 4. Those two processes are explained with reference to the flowcharts.

(1) Mail Reception Detection Process

The mail reception is detected in the following manner. After initiating the mail reception detection process, the control unit 4 determines whether a mail is received by the cellular phone 3 from the network 19 at step S1. If the mail has not been received, corresponding to NO at S1, the mail reception detection process is concluded to return to a parent process (e.g., a main process).

If the mail has been received, corresponding to YES at S1, the process determines whether the cellular phone 3 is in a voice call reception condition, or in a handsfree call condition, or in a private call condition, or in a waiting condition, based on the condition information input from the cellular phone 3 at steps S2 to S4.

If the condition of the cellular phone 3 is determined as waiting a call, corresponding NO at S2, NO at S3, and NO at S4, a mail reception notification message is displayed as a pop-up message on the screen 20 at S5, and a mail reception tone is simultaneously output from the speakers 13, 14. In this case, the control unit 4 continues to display the mail reception notification message for a predetermined period after popping up the message, for example. In this manner, the user can recognize the reception of a mail by either viewing the message on the screen 20 or by hearing the tone from the speakers 13, 14.

If the condition of the cellular phone 3 is determined as receiving a voice call, corresponding YES at S2, a mail reception notification message is displayed as a pop-up message on the screen 21 and a mail reception tone is simultaneously output from the speakers 13, 14 at S6. In this case, the control unit 4 continues to display the mail reception notification message for a predetermined period after popping up the message, for example. In this manner, the user can recognize the reception of a mail by either viewing the message on the screen 21 or by hearing the tone from the speakers 13, 14.

If the condition of the cellular phone 3 is determined as having a handsfree call, corresponding YES at S3, a mail reception notification message is displayed as a pop-up message "MAIL RECEIVED. DISCONNECT CALL, STOP VEHICLE AT A SAFE PLACE, AND CHECK MAIL." on the screen 22 shown in FIG. 8 and a mail reception tone is simultaneously output from the speakers 13, 14 at S7. In this case, the control unit 4 continues to display the mail reception notification message for a predetermined period or until the disconnection of the handsfree call after popping up, the message, for example. In this manner, the user can recognize the reception of a mail by either viewing a message 24 on the screen 22 or by hearing the tone from the speakers 13, 14.

If the condition of the cellular phone 3 is determined as having a private call, corresponding YES at S4, a mail reception notification message is displayed as a pop-up message on the screen 23 and a mail reception tone is simultaneously output from the speakers 13, 14 at S8. In this case, the control unit 4 continues to display the mail reception notification message for a predetermined period or until the disconnection of the private call after popping up the message, for example. In this manner, the user can recognize the reception of a mail by either viewing the message on the screen 23 or by hearing the tone from the speakers 13, 14.

The reception of a mail from the network 19 to the cellular phone 3 is notified to the user in any case by the pop-up message 24 and/or the tone from the speakers 13, 14. However, the user in waiting or receiving a voice call to the cellular phone 3 may notice the mail reception quite easily due to the lack of conversation, while the user involved in the private or handsfree call may not notice the mail reception due to the conversation with the caller. Therefore, the control unit 4 performs the following process when the cellular phone 3 is determined as having a private or handsfree call.

Figure 9:
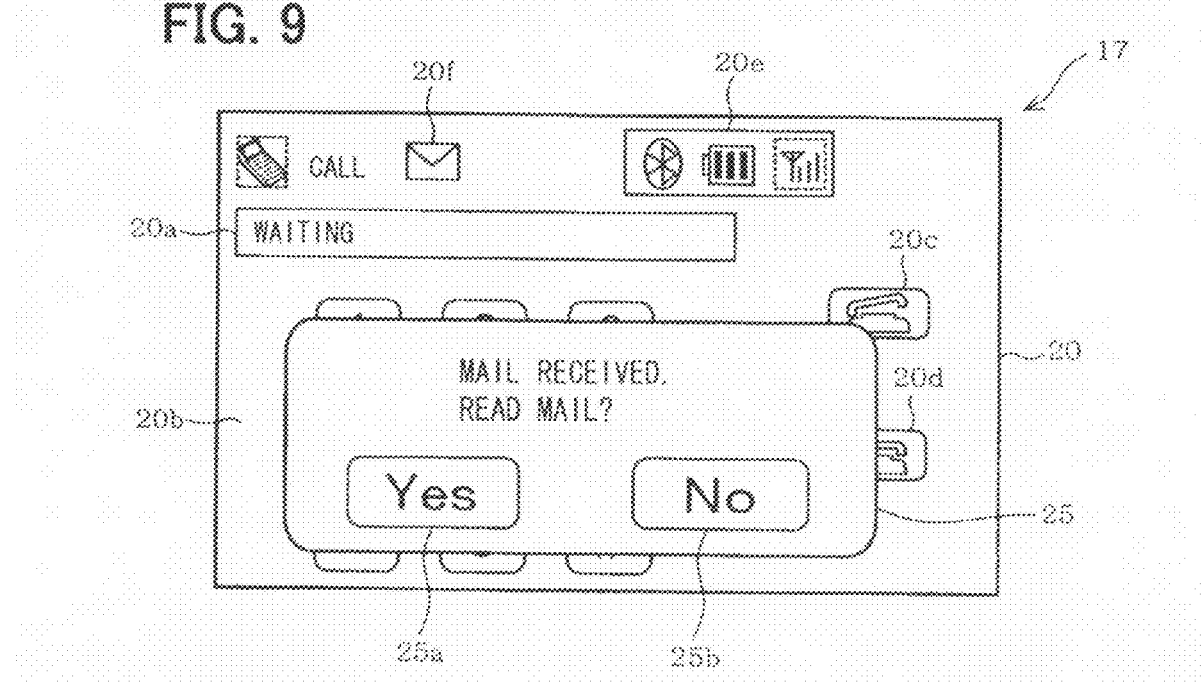
FIG. 9 is an illustration of an inquiry pop-up message for reading a mail in a screen in the embodiment.

That is, the control unit 4 determines whether the user has disconnected a handsfree call after mail reception notification to the user at step S9 if the cellular phone 3 is determined as having a handsfree call. Then, upon determining that the call has been disconnected as YES at S9, the screen 22 is switched to the screen 20, and a pop-up inquiry message 25 "MAIL RECEIVED. READ MAIL?" is displayed on the screen 20 at step S10, as shown in FIG. 9. In this case, the display of the message 25 is accompanied by displaying of a reception icon 20f in the screen 20.

The message 25 includes a YES button 25a for allowing the user to read the mail a NO button 25b for allowing the user not to read the mail. That is, the user may either read the mail or leave the mail as it is by choosing one of the two buttons 25a, 25b while the message 25 is displayed. Thereafter, the control unit 4 determines whether the user has read the mail by "opening a mail" to display the contents of the mail on the display screen 17 at step S11.

If selecting YES button 25a, another pop-up message 26 allowing the user to choose from three options is displayed on the screen 20 as shown in FIG. 10. The message 26 inquires the user about "DISPLAY TEXT OF THE MAIL? LIST MESSAGE TITLES?" by displaying the corresponding buttons.

In this case, the control unit 4 displays a CALCEL switch 26c together with a TEXT switch 26a and a LIST switch 26b for allowing the user to either display the text of the mail, to list the titles of the mails, or to cancel the inquiry message itself.

If selecting the TEXT button 26a (i.e., a text display operation in claims), the screen 20 is switched to a screen 27 for displaying the text of the mail, as shown in FIG. 11. In this case, the control unit 4 displays a sender's name of the received mail in a sender display area 27a, and displays a title of the mail in a title display area 27b, and displays the text of the mail in a text display area 27c.

In addition, the control unit 4 displays a READ-ON button 27d for scrolling the text of the mail for reading-on, a STORE button 27e for storing the received mail, a DELETE button 27f for deleting the mail, and a LIST button 27g for listing the mail titles, respectively allowing the user to perform an intended function. Further, the control unit 4 erases the reception icon 20f that was displayed at the time of popping up the message 25 on the screen 20.

Figure 12:
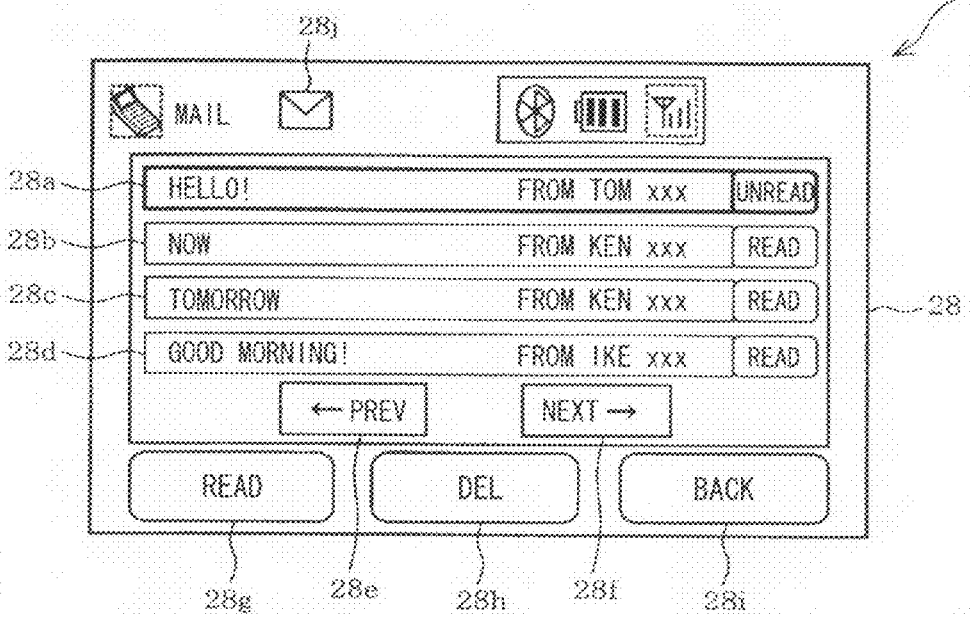
FIG. 12 is an illustration of a mail title list screen in the embodiment.

On the other hand, if selecting the LIST button 26b in the message 26 (i.e., a title display operation in claims), the screen 20 is switched to screen 28 as shown in FIG. 12. The screen 28 displaying the title list lists a just-received mail at a top of the list in a top title display area 28a, with subsequent titles of previously received mails in title display areas 28b to 28d in a time order, each of which is accompanied by either of a READ or UNREAD marking. In this case, the READ marking indicates that the text of the mail has been displayed on the screen, and the UNREAD marking indicates that the text of the mail has not been displayed.

Further, other buttons such as a PREVIOUS button 28e for displaying a previous title list page, as a NEXT button 28f for displaying a next title list page, a READ button 28g for displaying the text of the selected title, a DELETE button 28h for deleting the mail of the selected title, a BACK button 28i for going back to a previous screen are displayed. The control unit 4 does not erase, in this case, the reception icon 28j that was displayed at the time of popping up the message 25 on the screen 20.

In other words, if the user operates the YES button 25a in the message 25 and then operates the TEXT button 26a or the LIST button 26b in the message 26, determining that the user has displayed the text of the mail on the display screen 17 as YES at S11, the control unit 4 concludes the mail reception detection process to return to other processes without storing an unread history (i.e., yet-to-read history in claims) in the memory unit 7.

On the other hand, if the user operates the NO button 25b in the message 25, or operates none of the YES button 25a and the NO button 25b, or operates the CANCEL switch 26c on the message 26, determining that the user has not displayed the text of the mail on the display screen 17 or that the user has not displayed the title list as NO at S11, the control unit concludes the mail reception detection process to return to other processes by storing an unread history in the memory unit 7, which indicates that an unread mail exists.

In the above description, a case that the cellular phone 3 is having a handsfree call while receiving the mail is described. The cellular phone 3 having a private call has the same operation scheme in terms of the mail reception notification. That is, the control unit 4 determines whether the user has disconnected a private call after mail reception notification to the user at step S13 if the cellular phone 3 is determined as having a private call. Then, upon determining that the call has been disconnected as YES at S13, the screen 23 is switched to the screen 20, and the pop-up inquiry message 25 is displayed on the screen 20 at step S10, as shown in FIG. 9. Then, steps S11 and S12 follow.

Further, the control unit 4 displays the message 26 after displaying the message 25 when the mail-receiving cellular phone 3 is in waiting or is receiving a voice call, without determining whether the user has performed an operation to display the text of the mail on the display screen 17.

(2) Disconnection Request Detection Process

The disconnection request detection process for disconnecting BT connection link between the BT interface unit 5 and the cellular phone 3 is performed in the following manner.

When the control unit 4 starts the disconnection request detection process, the control unit 4 determines whether a request for disconnecting the BT connection link is generated or not at step S21. If determining NO at S21, the disconnection request detection process is concluded to return to the other process, such as returning to a main process.

If determining YES at S21, the cause of the disconnection request is determined in steps S22 to S24. That is, whether the disconnection request is caused by the power-off operation by the user, or by the disconnection operation by the user on the handsfree apparatus 2, or by the disconnection operation by the user on the cellular phone 3, is determined.

If the control unit 4 determines that the disconnection request is caused by the turning off of the power supply (i.e., fulfillment of a first condition in claims) after determining turning off of the ACC signal to the signal input unit 10 by the user for the purpose of getting off from the vehicle as YES at S22, the control unit 4 disconnects the BT communication link between the BT interface unit 5 and the cellular phone 3, and switches the operation mode from the normal operation to the low power consumption operation. Then, the control unit 4 determines whether there is an unread history stored in the memory unit 7 it step S25. Then, upon determining that there is no unread history in the memory unit 7 as NO at S25, the control unit 4 concludes the disconnection request detection process to return to the other process.

Figure 13:
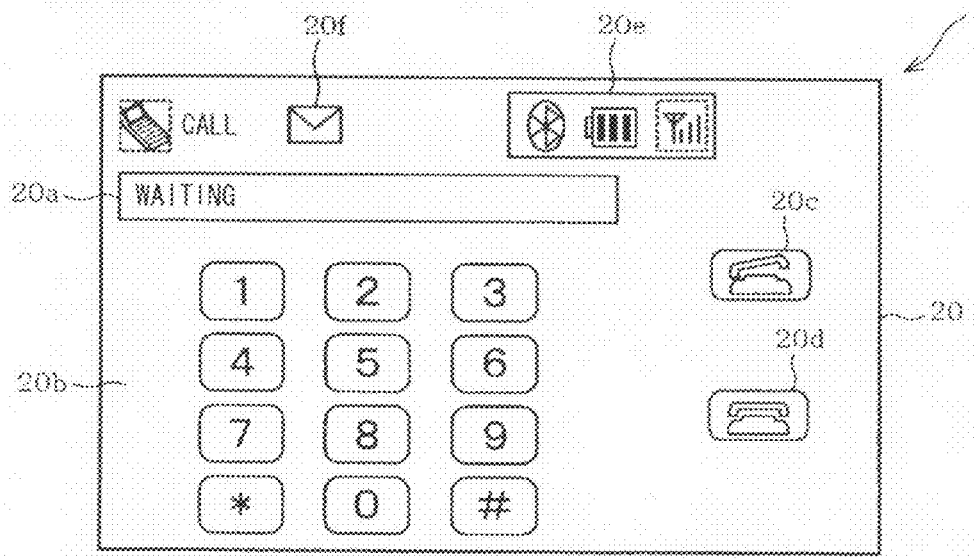
FIG. 13 is an illustration of a waiting screen with a mail reception icon in the embodiment.
Figure 14:
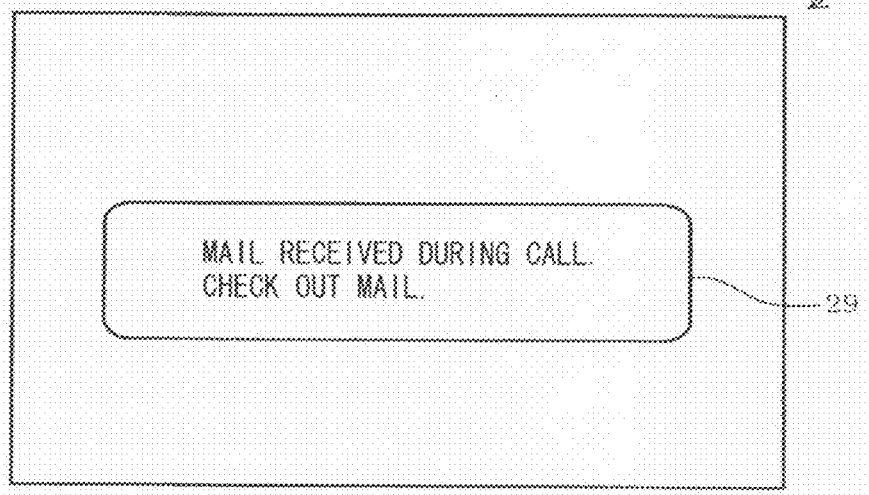
FIG. 14 is an illustration of a not-yet-read mail notification message in a screen in the embodiment.
Figure 15:
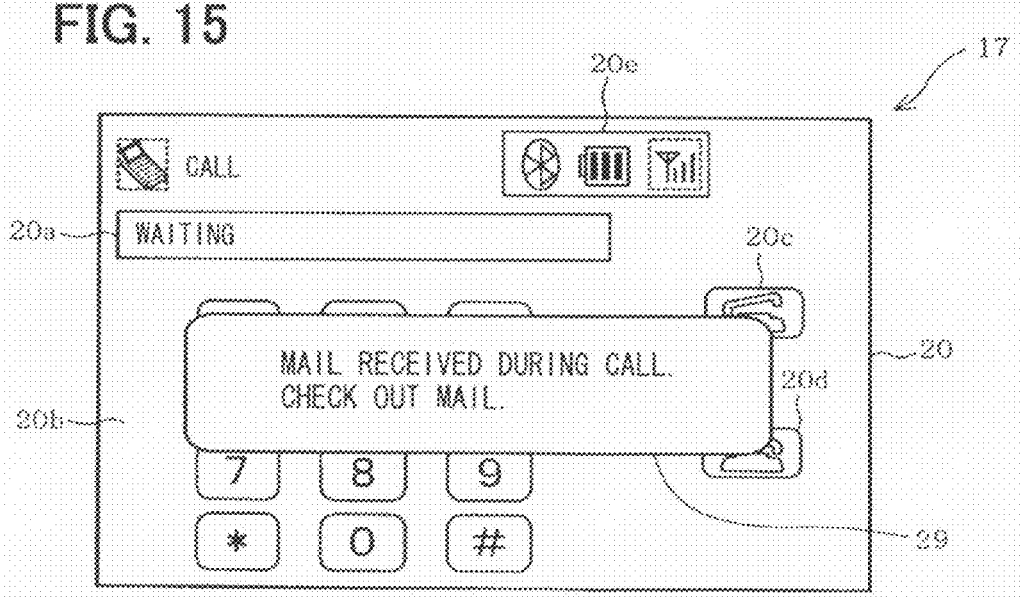
FIG. 15 is an illustration of a not-yet-read mail notification message in the waiting screen in the embodiment.

On the other hand, as shown in FIGS. 13 and 14, the control unit 4 notifies the user of the mail reception by displaying a screen 29 having a message "MAIL RECEIVED DURING CALL. CHECK OUT MAIL." and by outputting an unread history notification tone from the speakers 13, 14 at step S26 (i.e:, notification of yet-to-read information in claims) while erasing the waiting screen 20 due to the low power consumption operation, if it is determined that the unread history is stored in the memory unit 7 as YES at S25. In this manner, the user can recognize that there is an unread mail based on the message on the screen and the output sound.

In addition, when the control unit 4 determines that the disconnection request is caused by the disconnection operation by the user on the handsfree apparatus 2 as YES at S23, after determining that a disconnection switch (not shown in the drawing) is operated for the purpose of switching the BT connection link from one cellular phone 3 to the other cellular phone (i.e., fulfillment of the first condition in claims), the same operation as the turning off of the power supply is performed after disconnecting the BT connection link between the BT interface unit 5 and the cellular phone 3.

In other words, the control unit 4 determines whether an unread history is memorized in the memory unit 7 at step S27, and then displays the screen 29 as a pop-up message "MAIL RECEIVED DURING CALL. CHECK OUT MAIL." on the waiting screen 20, which is not erased in this case, for notifying the user of the unread history of the mail, with the unread history notification tone output from the speakers 13, 14 at S28 (i.e., notification of yet-to-read information in claims), upon determining that there is an unread history in the memory unit 7 as YES at S27. In this manner, the user can recognize that there is an unread mail based on the message on the screen and the output sound.

If, on the other hand, the control unit 4 determines, as YES at S24, that the disconnection request is caused by the operation of the disconnection key (not shown in the drawing) by the user on the cellular phone 3 based on the condition input from the cellular phone 3 (i.e., fulfillment of a second condition in claims), the control unit 4 concludes the disconnection request detection process to return to the other process after disconnecting the BT connection link between the BT interface unit 5 and the cellular phone 3, without determining whether or not the unread history is stored in the memory unit 7, which is different from the case where the user performs the power off operation, or from the case where the disconnection operation by the user is performed on the handsfree apparatus 2.

The operation scheme of the handsfree apparatus 2 in the present embodiment is advantageous, because (a) the mail reception notification is provided for the user when the mail is received by the cellular phone 3 while the user is involved in the handsfree call or the private call by using the cellular phone 3, and (b) the unread mail history is stored based on the determination that the received mail has not been read (i.e., displayed) due to the lack of the mail display operation, and (c) the unread mail history is notified to the user when the BT communication link to the cellular phone 3 that has received the mail is disconnected. That is, the handsfree apparatus 2 continuously reminds the user of the mail, at least two timings, thereby preventing the user from leaving the mail in an unread condition.

More practically, when the user turns off the power supply for getting off from the vehicle or when the user performs the BT connection link disconnection operation on the handsfree apparatus 2 for switching from one cellular phone 3 to another phone, the user is notified about the unread mail at that power-off timing or at that cellular phone switching timing, thereby recognizing the unread mail.

In other words, if the power off operation is performed by the user for the purpose of getting off from the vehicle, or if the disconnection operation of the. BT communication link is performed by the user on the handsfree apparatus 2 for the purpose of switching between the cellular phones 3, the user is assumed that he/she has not operated the cellular phone 3. Even in such a situation, the user is reminded of the unread mail at an appropriate timing by the handsfree apparatus 2.

On the other hand, the user is not notified of the unread mail history when the BT connection link is disconnected by the operation performed on the cellular phone 3. That is, when the user performs the BT connection disconnection operation on the cellular phone 3, the user is using the cellular phone 3. Thus, there is no need to notify the user of the unread mail from the handsfree apparatus 2, thereby improving the usability of the apparatus 2 due to the operation scheme that eliminates the unread mail notification.

Although the present disclosure has been fully described in connection with preferred embodiment thereof with reference to the accompanying drawings, it is to be noted that various changes and modifications will become apparent to those skilled in the art.

For example, the function of the handsfree apparatus may be incorporated in another apparatus such as an in-vehicle navigation apparatus or the like.

Various designs of the screen layout may be adopted for differentiating the look of the screen from the one described in the above embodiment, and the buttons (i.e., touch switches) on the screen may be replaced with mechanical switches. Further, operation procedure of those mechanical switches may be displayed on the display unit.

Mail reception during the handsfree call and mail reception during the private call may be notified in respectively different manners. That is, for example, the mail reception during the handsfree call may be notified by the notification screen and notification tone, and the mail reception during the private call may be notified only by the notification screen. Or, the mail reception during the private call may be notified by the notification screen and notification tone, and the mail reception during the handsfree call may be notified only by the notification screen. The user may select the above two options of mail reception notification method.

The mail reception notification screen may be used without notification tone. That is, mail reception may be notified only by the screen without using the notification tone. The screen only notification and screen and tone notification may be selected by the user.

The number of the mails received during a call may be displayed. That is, if there are two or more mails received while the user is involved in one call, not only the reception of the mail but also the number of received mails may be notified.

The title list display may not be considered as the display of the mail contents. That is, the mail may be considered as displayed only when the text of the mail is displayed on the screen, instead of defining both of the mail text display and the title list display as display of the mail.

Such changes, modifications, and summarized schemes are to be understood as being within the scope of the present disclosure as defined by appended claims.

What is claimed is:

1. A handsfree apparatus in a vehicle comprising:
   a connection unit establishing a simultaneous connection of a handsfree call protocol and a mail transfer protocol while the handsfree apparatus is connected to a cellular phone through a short range wireless communication link, the handsfree protocol for a handsfree call and the mail transfer protocol for a transfer of mails;
   a condition determination unit determining whether or not the cellular phone having an established handsfree call protocol is having a call;
   a mail reception determination unit determining whether or not the cellular phone having an established mail transfer protocol has received a mail;
   a reception notification unit notifying a user of a reception of the mail;
   a mail display unit displaying a mail content of the mail that has been transferred from a network to the cellular phone;
   a display operation reception unit receiving a mail display operation by a user for the displaying of the mail content;
   a controller controlling the reception notification unit to notify the user of the reception of the mail if the mail reception by the cellular phone is determined by the mail reception determination unit, and controlling the mail display unit to display the mail content if the mail display operation by the user is received by the display operation reception unit, when the cellular phone having the simultaneous connection of the handsfree call protocol and the mail transfer protocol established to the connection unit is determined to be having a call by the condition determination unit; and
   a storage unit storing yet-to-read history indicative of existence of a not yet displayed mail that has not yet been displayed on the mail display unit, wherein
   (a) the controller controls the storage unit to store the yet-to-read history, if (a1) the mail reception is notified for the user by the reception notification unit and (a2) the mail display operation by the user is not received by the display operation reception unit,
   (b) the controller determines whether or not a mail that has not been displayed by the mail display unit exists based on the yet-to-read history stored by the storage unit after disconnection of the short range communication link between the connection unit and the cellular phone having received the mail due to a fulfillment of a first condition, and
   (c) the controller controls a notification unit to notify the user of yet-to-read information that indicates that existence of not yet displayed mail has been determined.

2. The handsfree apparatus of claim 1 further comprising:
   a switch-off operation reception unit receiving a switch-off operation performed by a user on an apparatus side, wherein
   the switch-off operation switches the operation of the apparatus from a power-on condition to a power-off condition, and
   the controller regards the switch-off operation received by the switch-off operation reception unit as the fulfillment of the first condition.

3. The handsfree apparatus of claim 1 further comprising:
   a disconnection operation reception unit receiving from a user a disconnection operation that disconnects the short range wireless communication link between the connection unit and the cellular phone that has received a mail, wherein
   the controller regards the disconnection operation received by the disconnection operation reception unit as the fulfillment of the first condition.

4. The handsfree apparatus of claim 1, wherein
   the controller prohibits the notification unit from notifying the user of the yet-to-read information regardless of the determination of the existence of the mail that has not been displayed by the mail display unit when the short range wireless communication link between the connection unit and the cellular phone that has received a mail is disconnected due to fulfillment of a second condition that is different from the first condition.

5. The handsfree apparatus of claim 4 further comprising:
   a cellular phone side disconnection operation reception determination unit determining a reception of a disconnection operation of the user on the cellular phone to disconnect the short range wireless communication link between the connection unit and the cellular phone that has received a mail, wherein
   the controller regards the disconnection operation received by the cellular phone side disconnection operation reception determination unit as the fulfillment of the second condition.

6. The handsfree apparatus of claim 1, wherein
the display operation reception unit receives from the user a text display operation for displaying, on the mail display unit, text of the mail received from the network by the cellular phone, and
the controller controls the storage unit to store the yet-to-read history when the display operation reception unit does not receive the text display operation in response to a mail reception notification provided from the reception notification unit to the user.

7. The handsfree apparatus of claim 1, wherein
the display operation reception unit receives from the user a title display operation for displaying, on the mail display unit, a title list of the mail received from the network by the cellular phone, and
the controller controls the storage unit to store the yet-to-read history when the display operation reception unit does not receive the title display operation in response to a mail reception notification provided from the reception notification unit to the user.

* * * * *